June 26, 1962  N. A. MacLEOD  3,041,456
LUMINESCENT SCREENS AND METHODS OF MAKING SAME
Original Filed Nov. 26, 1956  2 Sheets-Sheet 1
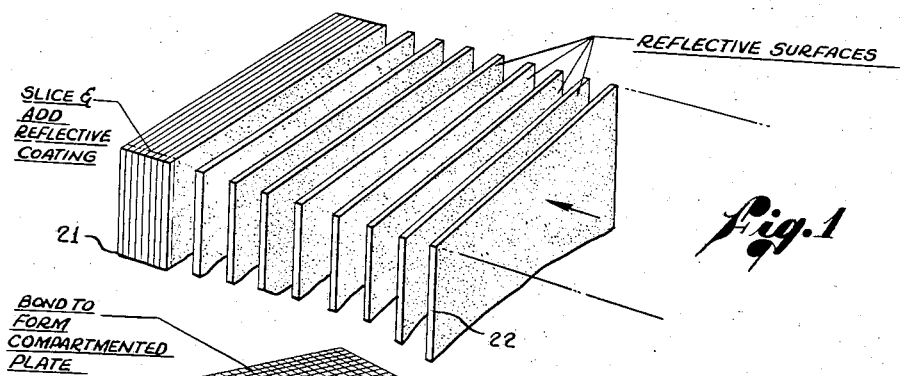
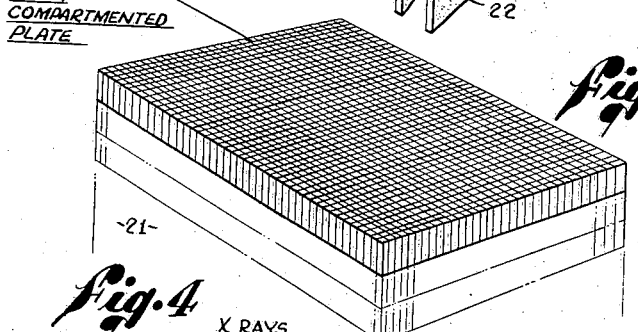
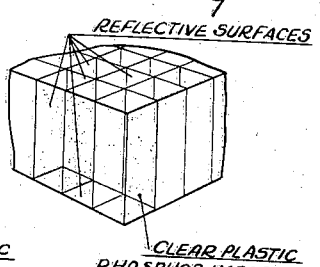
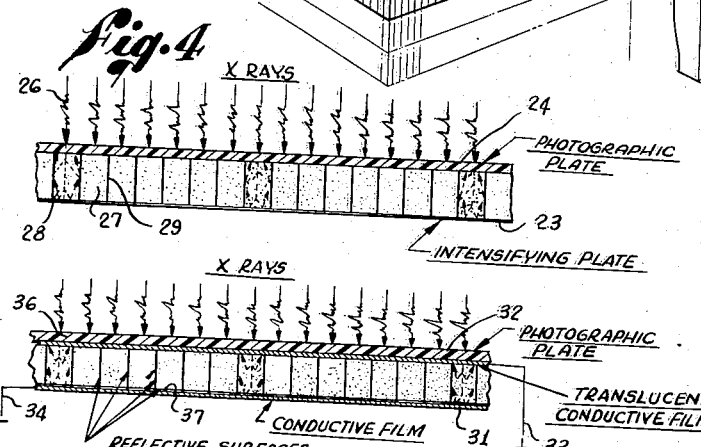
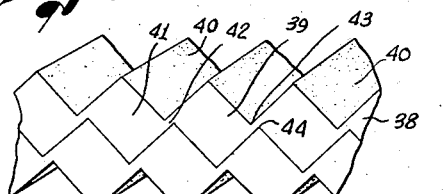
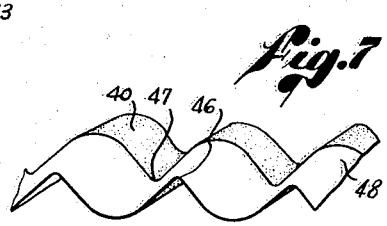
NORMAN A. MacLEOD
INVENTOR.
HUEBNER, BEEHLER, WORREL & HERZIG
ATTORNEYS
By Warren T. Jessup June 26, 1962   N. A. MacLEOD   3,041,456
LUMINESCENT SCREENS AND METHODS OF MAKING SAME
Original Filed Nov. 26, 1956
2 Sheets-Sheet 2
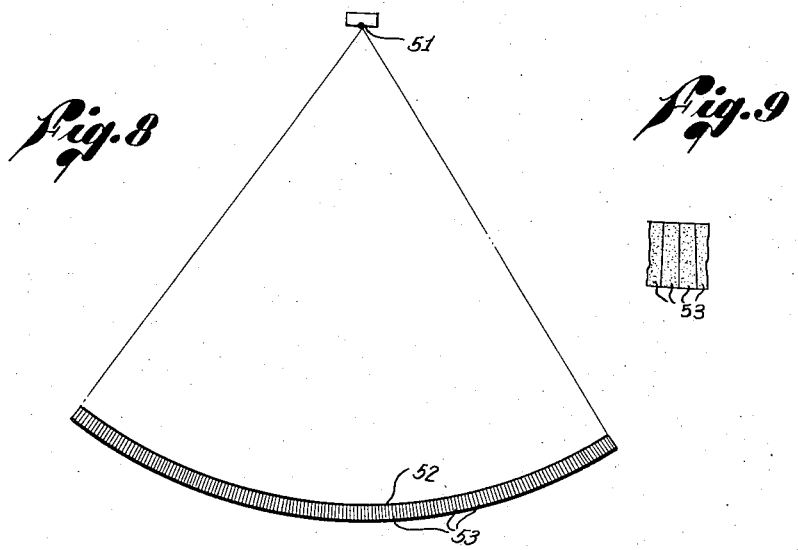
NORMAN A. MacLEOD
INVENTOR.
HUEBNER, BEEHLER, WORREL & HERZIG
ATTORNEYS
By Warren T. Jessup

United States Patent Office 3,041,456
Patented June 26, 1962

3,041,456
LUMINESCENT SCREENS AND METHODS OF
MAKING SAME
Norman A. MacLeod, 1161 Edgemont St., La Habra,
Calif., assignor of one-half to I. J. McCullough, Vernon,
Calif.
Original application Nov. 26, 1956, Ser. No. 624,378. Divided and this application Feb. 20, 1959, Ser. No. 794,692
6 Claims. (Cl. 250—80)

This invention relates to luminescent screens and methods for making the same.

It is an object of this invention to provide an improved screen for receiving excitation energy and converting it into useful radiant energy in or near the visible spectrum. The received energy may be in the form of moving sub-atomic particles, such as an electron beam, or may be in the form of radiant energy, such as X-rays or ultraviolet light.

Zinc sulfide intensifying screens have been used in the past to convert X-rays into radiant energy within a spectrum to which photographic plates are more sensitive. Such zinc sulfide intensifying screens, however, have the limitation that their effect is limited to surface action without appreciable depth of conversion.

It is another object of this invention to overcome this superficial limitation of the prior art zinc sulfide X-ray intensifying screens.

Optically transparent plastic screens impregnated with luminescent substances, or phosphors, may be used; and up to a point, the thicker the screen, the greater is the intensification, or conversion of received energy to useful radiant energy in or near the visible spectrum. Thickening of the screen is, however, accompanied by loss of definition, or image sharpness.

Another object of this invention is, therefore, to obviate the lack or loss of definition associated with the use of such phosphor impregnated plastic screens.

In accordance with these and other objects which will become apparent hereinafter, preferred forms of the present invention and preferred methods of making the same will now be described with reference to the accompanying drawings, wherein:

FIG. 1 shows an early step in the production of a compartmented screen constructed in accordance with the present invention;

FIG. 2 illustrates a further step in the production of such a screen;

FIG. 3 is a fragmentary enlarged view showing one corner of a screen;

FIG. 4 is a fragmentary cross-section showing a refinement of the present invention;

FIG. 5 is a fragmentary cross-section showing a further refinement of the present invention;

FIG. 6 is a fragmentary perspective view illustrating a form of configuration which the screen compartments may assume;

FIG. 7 is an alternative modification of the FIG. 6 style of compartment;

FIG. 8 is a schematic view illustrating an arcuate or curved screen constructed in accordance with the present invention; and FIG. 9 is an enlarged fragmentary view of a portion of FIG. 8.

The product of the present invention is a luminescent compartmented screen having a finite but very small thickness ranging from .010 inch to .200 inch in thickness. The screen is interlaced by a multitude of walls transverse or normal to the surface of the screen, which walls form tiny compartments extending normal to the surface of the screen. The interiors of the compartments themselves are optically translucent, while the walls of the compartment are optically opaque. Within each compartment is a luminescent substance, or phosphor, having the property of converting particulate energy or short wave length energy into energy lying in or near the visible spectrum, so that the excitation of the screen may be seen by the human eye, or recorded by a photographic emulsion, liquid gel, plastic or crystalline.

The screen is preferably made of a translucent substance, that is to say, the compartments are filled with the translucent substance, which is preferably a plastic but may be gel, liquid or crystalline. It is preferred to contain the luminescent substance, or phosphor in the compartments by dispersing it substantially homogeneously throughout the plastic. Both the plastic (as aforesaid) and the phosphor are essentially translucent, so that light is not significantly attenuated in its passage through the compartment.

The compartmentation, effected by use of the opaque walls, produces a sharp definition, which would be absent without the walls, because the energy, upon striking the phosphor-impregnated plastic causes emanation of light waves in all directions, thus losing or destroying definition. By compartmenting as aforesaid, definition is retained, and particularly so if the depth of the compartments, i.e. the thickness of the screen, is made several times the maximum dimension across the compartment. It is preferred to make the depth from 3 to 10 times as great as the width or other maximum cross dimension of the compartment.

While it is preferred to employ the phosphor by dispersing it throughout the plastic in the compartment, the phosphor may also be applied by lining the walls of the compartment therewith. If desired, both methods of applying the phosphor may be employed to advantage. It is preferred to make the walls light reflective, in order to preserve to the maximum the light which is generated in the compartment by the excitation from the particulate beams or the radiant energy.

Screens in accordance with the present invention are particularly useful in the field of X-rays, and in the interest of clarity will be described in that connection. It is to be understood, however, that as mentioned hereinbefore, any suitable form of excitation may be employed.

Methods of constructing screens in accordance with the present invention will now be described with reference to the drawings.

In FIG. 1 there is shown an orthogonal body 21 of translucent plastic, which in its production has been impregnated with a translucent phosphor dispersed substantially homogeneously throughout the body of the plastic 21. The body 21 is first sliced into a plurality of thin slices 22. Between the slices there is placed an opaque coating. This may be done by coating either one or both sides of each slice with a material which forms a reflective surface, as well as being opaque, as for example, magnesium oxide. A layer or coating of bonding material is then applied between each of the slices, and the body 21 is reformed by bonding the slices back together again. If desired the opaque material may be incorporated in the bonder to minimize steps. The body 21 is now in effect optically laminated by the opaque walls formed from the coating material.

The body 21 is then sliced into a plurality of slices along planes transverse to the first planes so as to form another series of slices transverse to the first formed slices. The coating-bonding operation is then repeated, and the body 21 is reformed into the doubly laminated body shown in FIG. 2. This body thus has a plurality of tubular optical compartments, each tube consisting of a square ranging on the side from about .003 inch to about .050 inch.

Finally, the body 21 shown in FIG. 2 is sliced along parallel planes normal or transverse to both laminations, to form a plurality of compartmented screens, one corner of such multi-cellular screen being shown enlarged in FIG. 3. As indicated hereinbefore, the thickness of the screen is preferably from 3 to 10 times as great as the side of one of the compartment squares.

As indicated hereinafter, phosphors may also be embodied in the opaque coating material which forms the compartment walls, thereby to enhance the transmuting effect and give greater light conversion within the screen.

A typical use of a screen constructed as aforesaid and as illustrated in FIGS. 1, 2 and 3 is illustrated in FIG. 4.

In this instance, one face of the screen is provided with an intensifying plate, preferably in the form of a reflective, opaque coating 23. Contiguous to the opposite face or surface of the screen there is laid a photographic negative 24. X-rays applied to the screen from above, as shown at 26, pass through the photographic film or plate 24 where they have some effect, since the film has some sensitivity to X-rays. The rays 26 pass into the individual compartments 27, as shown at 28, and there are converted by the phosphor into radiant energy lying in the visible or near visible spectrum to which the film is much more sensitive. These light rays emanate, and are reflected, upward, back to the plate or film 24. The presence of the walls 29 between compartments 27 prevents the light rays from being dispersed horizontally along the screen and film 24, and thus sharp definition is preserved, the degree of definition varying inversely with the size or cross-section of the compartments 27. The appreciable depth or thickness of the screen compared to the cross-section of each compartment 27 allows for maximum practical conversion of the X-ray energy into visible light as the X-rays penetrate deeper and deeper into the compartment 27. Up to an optimum point, intensification varies directly with the thickness of the screen.

To further trap the light, and thereby increase intensification, the upper surface of plate 24 may be coated with a thin layer of material which is light reflective but offers little attenuation to passage of X-rays or particulate beams.

A further refinement in this use of the invention is illustrated in FIG. 5, wherein electrically conductive films or plates 31 and 32 are applied, as by coating, to each surface of the screen, and an electric potential is applied between the two plates, by means of the terminals 33 and 34. The presence of the electrostatic field across the compartments 27 containing the phosphor enhances the photo-emission, and gives increased conversion of X-ray energy into visible light. In this application of the present invention, at least the film 32 must be relatively translucent as well as conductive in order to allow the light generated within the compartment to pass back and affect the photographic film 36. The opposite side or surface of the screen, however, is preferably opaque, and this may be conveniently effected by providing a reflective screen 37 in the same manner as the screen or plate 23 was provided in FIG. 4.

A preferred manner of providing the compartments in the screen is illustrated in FIG. 6. A plurality of corrugated sheets of phosphor-impregnated plastic 38 are formed, preferably by extrusion, and are then interlocked one with the other and bonded together to form the compartments 39. Prior to interlocking, the sheets are coated with an opaque, and preferably reflective, material 40 as described hereinbefore in connection with FIGS. 1 and 2.

The corrugations of the sheets 38 are preferably offset, as shown particularly in FIG. 6, so that adjacent compartments, for example, compartments 39 and 41 are joined together by narrow isthmus-like passages 42, which minimize the passage of light from one compartment to another, while still retaining physical continuity from compartment to compartment, thus allowing the sheet 38 to be formed or extruded as an integral piece. The opposite corrugated surfaces of the sheet 38 are preferably so formed that the innermost apex of the V on one side of the sheet 38, as shown at 43, extends slightly beyond the corresponding V apex 44 on the opposite side of the sheet, so that there is effectively blocked a straight-through line of light passage along the length of the sheet 38. Thus, while there will be some light leakage between adjacent compartments, there is not formed a continuous straight band of light completely across the screen paralleling the sheet 38.

A modification of the sheet shown in FIG. 6 is shown in FIG. 7, wherein the corrugations, instead of having sharp corners, are rounded, as shown at 46 and 47. The coating, bonding, and nesting or interlocking are effected in the same manner as the FIG. 6 modification. It will be noted that, as in FIG. 6, the inward extensions of the corrugations overlap in order to preclude passage of a light beam completely along the sheet 48.

If desired, the screen may be made curved, following, for example, the arc of a cylinder or a sphere, as shown schematically in FIG. 8. Such a configuration would be useful where there is essentially a line or point source of excitation as shown at 51. Such sources are to be found, by way of example, in cathode-ray tubes, television screens, and the like. By virtue of the compartmentation shown at 52, definition is greatly enhanced and the impregnation of the plastic compartments 53 with a translucent phosphor gives improved transmutation of the electron beam into visible light energy.

This is a division of co-pending patent application Ser. No. 624,378, filed November 26, 1956, by Norman A. MacLeod, for Luminescent Screens and Methods of Making Same.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What is claimed is:

1. Compartmented screen comprising a plurality of generally parallel, optically opaque, corrugated walls, disposed substantially normal to the surface of the screen, and offset so as to form adjacent, boxlike, optically translucent compartments joined together by narrow isthmus-like passages, the corrugations in each wall extending slightly past the corrugations of the adjacent wall so as to block passage of a light beam from compartment to compartment along a straight line joining more than two compartments, and phosphor within said compartments.

2. A screen of solid light-transmitting material comprising a plurality of generally parallel, optically opaque, corrugated walls, disposed substantially normal to the surface of the srceen, and offset so as to form adjacent, boxlike, optically translucent compartments joined together by narrow isthmus-like passages, the corrugations in each wall extending slightly past the corrugations of the adjacent wall so as to block passage of a light beam from compartment to compartment along a straight line joining more than two compartments.

3. A screen of solid light-transmitting material comprising a plurality of generally parallel, optically opaque, corrugated walls, disposed substantially normal to the surface of the screen, and offset so as to form adjacent, boxlike, optically translucent compartments joined together by narrow isthmus-like passages.

4. Compartmented screen comprising a plurality of generally parallel, optically opaque, corrugated walls, disposed substantially normal to the surface of the screen, and offset so as to form adjacent, boxlike, optically translucent compartments joined together by narrow isthmus-like passages, and phosphor within said compartments.

5. A compartmented screen comprising a plurality of solid light-transmitting members having opposite faces forming contiguous screen surfaces, said members having corrugated opposite side walls interfitted into close proximity, and opaque material disposed between said side walls, whereby a screen is formed having a plurality of closely adjacent compartments.

6. A compartmented screen according to claim 5 wherein the corrugations of said opposite side walls of said members are offset so as to form adjacent optically translucent compartments joined together by narrow isthmus-like passages, portions of the corrugations in each side wall extending slightly past the corrugations of an adjacent wall whereby said opaque material blocks passage of a light beam from compartment to compartment along a straight line joining more than two compartments.

References Cited in the file of this patent

UNITED STATES PATENTS

| | | |
|---|---|---|
| 2,143,303 | Darimont | Jan. 10, 1939 |
| 2,495,697 | Chilowsky | Jan. 31, 1950 |
| 2,827,571 | Klasens et al. | Mar. 18, 1958 |
| 2,829,264 | Garrison | Apr. 1, 1958 |
| 2,882,413 | Vingerhoets | Apr. 14, 1959 |
| 2,885,558 | Destrain | May 5, 1959 |
| 2,945,128 | Sun et al. | July 12, 1960 |